US008731209B2

(12) United States Patent
Uhle et al.

(10) Patent No.: US 8,731,209 B2
(45) Date of Patent: May 20, 2014

(54) DEVICE AND METHOD FOR GENERATING A MULTI-CHANNEL SIGNAL INCLUDING SPEECH SIGNAL PROCESSING

(75) Inventors: Christian Uhle, Nuremberg (DE); Oliver Hellmuth, Erlangen (DE); Juergen Herre, Buckenhof (DE); Harald Popp, Tuchenbach (DE); Thorsten Kastner, Stockeim/Reitsch (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1046 days.

(21) Appl. No.: 12/681,809

(22) PCT Filed: Oct. 1, 2008

(86) PCT No.: PCT/EP2008/008324
§ 371 (c)(1), (2), (4) Date: Apr. 15, 2010

(87) PCT Pub. No.: WO2009/049773
PCT Pub. Date: Apr. 23, 2009

(65) Prior Publication Data

US 2010/0232619 A1 Sep. 16, 2010

(30) Foreign Application Priority Data

Oct. 12, 2007 (DE) ......................... 10 2007 048 973

(51) Int. Cl.
*H04B 3/00* (2006.01)

(52) U.S. Cl.
USPC ................. 381/80; 381/307; 381/10; 381/98; 381/120; 455/136; 704/214

(58) Field of Classification Search
USPC ........... 381/1, 2, 5, 7, 10, 11, 13, 17–23, 300, 381/302, 303, 307, 28, 61, 27, 103, 80, 85, 381/86, 332, 94.2, 94.3, 94.7, 97, 98, 99, 381/100, 101, 102, 118, 120, 119, 316, 381/71.14, 93, 320, 318, 83, 95, 321, 312, 381/314, 317, 94.1–94.8, 71.6, 71.4, 74, 381/23.1, 60; 700/94; 704/214, 231, 233, 704/237, 246, 270, 275; 379/406.01–406.16, 52; 455/136, 296, 455/222, 570
See application file for complete search history.

(56) References Cited

U.S. PATENT DOCUMENTS 5,197,100 A 3/1993 Shiraki
(Continued)

FOREIGN PATENT DOCUMENTS

DE 10 2006 017 280 A1 10/2007
(Continued)

OTHER PUBLICATIONS

Official Communication issued in corresponding Russian Patent Application No. 2010112890/08, mailed on Jan. 30, 2012.
(Continued)

*Primary Examiner* — Leshui Zhang
(74) *Attorney, Agent, or Firm* — Keating & Bennett, LLP

(57) ABSTRACT

In order to generate a multi-channel signal having a number of output channels greater than a number of input channels, a mixer is used for upmixing the input signal to form at least a direct channel signal and at least an ambience channel signal. A speech detector is provided for detecting a section of the input signal, the direct channel signal or the ambience channel signal in which speech portions occur. Based on this detection, a signal modifier modifies the input signal or the ambience channel signal in order to attenuate speech portions in the ambience channel signal, whereas such speech portions in the direct channel signal are attenuated to a lesser extent or not at all. A loudspeaker signal outputter then maps the direct channel signals and the ambience channel signals to loudspeaker signals which are associated to a defined reproduction scheme, such as, for example, a 5.1 scheme.

22 Claims, 8 Drawing Sheets

(56) References Cited

U.S. PATENT DOCUMENTS

| | | | | |
|---|---|---|---|---|
| 6,351,733 | B1 | 2/2002 | Saunders et al. | |
| 6,928,169 | B1 | 8/2005 | Aylward | |
| 7,003,452 | B1 | 2/2006 | Lubiarz et al. | |
| 7,162,045 | B1 * | 1/2007 | Fujii | 381/94.2 |
| 7,567,845 | B1 * | 7/2009 | Avendano et al. | 700/94 |
| 2005/0027528 | A1 | 2/2005 | Yantorno et al. | |
| 2007/0041592 | A1 | 2/2007 | Avendano et al. | |
| 2007/0112559 | A1 | 5/2007 | Schuijers et al. | |
| 2007/0189551 | A1 | 8/2007 | Kimijima | |
| 2007/0242833 | A1 | 10/2007 | Herre et al. | |
| 2009/0252339 | A1 | 10/2009 | Obata et al. | |

FOREIGN PATENT DOCUMENTS

| | | | |
|---|---|---|---|
| EP | 1 021 063 | A2 | 7/2000 |
| EP | 1 730 726 | B1 | 10/2007 |
| JP | 03-236691 | A | 10/1991 |
| JP | 07-110696 | A | 4/1995 |
| JP | 07-123499 | A | 5/1995 |
| JP | 2000-295699 | A | 10/2000 |
| JP | 2001-069597 | A | 3/2001 |
| JP | 2001-100774 | A | 4/2001 |
| JP | 2007-028065 | A | 2/2007 |
| JP | 2007-201818 | A | 8/2007 |
| KR | 10-2007-0091517 | A | 9/2007 |
| RU | 2002 126 217 | A | 4/2004 |
| RU | 2005 135 648 | A | 3/2006 |
| WO | 99/53612 | A1 | 10/1999 |
| WO | 2005/101370 | A1 | 10/2005 |
| WO | 2007/034806 | A1 | 3/2007 |
| WO | 2007/096792 | A1 | 8/2007 |

OTHER PUBLICATIONS

Official Communication issued in International Patent Application No. PCT/EP2008/008324, mailed on Dec. 15, 2008.

Shapiro, "Crutchfield. 5.1-Channel Sound: From the Studio to Your Home Theater", Sep. 23, 2003, http://www.crutchfield.com/learn/reviews/20030923/5_1_sound.html.

Walther et al., "Using Transient Suppression in Blind Multi-Channel Upmix Algorithms", Audio Engineering Society Convention Paper 6990, May 5-8, 2007, pp. 1-10.

Monceaux et al., "Descriptor-Based Spatialization", Audio Engineering Society Convention Paper 6341, May 28-31, 2005, pp. 1-8.

Official Communication issued in corresponding Japanese Patent Application No. 2010-528297, mailed on Nov. 29, 2011.

Avendano et al.,"Ambience Extraction and Synthesis from Stereo Signals for Multi-Channel Audio Up-Mix", IEEE International Conference on Acoustics, Speech and Signal Processing, 2002, pp. 1957-1960.

Irwan et al., "A Method to Convert Stereo to Multi-Channel Sound", AES 19th International Conference, Jun. 21-24, 2001, pp. 1-5.

Schroeder, "An Artificial Stereophonic Effect Obtained from Using a Single Signal", Journal of the Audio Engineering Society, Apr. 1958, vol. 6, No. 2, pp. 74-79.

Faller, "Pseudostereophony Revisited", AES 118th Convention, May 28-31, 2005, pp. 1-9.

Monceaux et al., "Descriptior-based Spatialization", AES 118th Convention, May 28-31, 2005, pp. 1-8.

Schmidt, "Single-Channel Noise Suppression Based on Spectral Weighting—An Overview", 2004, pp. 10-24.

Hansen et al., "FIR Filter Representation of Reduced-Rank Noise Reduction", IEEE Transactional on Signal Processing, Jun. 1998, vol. 46, No. 6, pp. 1737-1741.

Anderson et al., "Audio Signal Noise Reduction Using Multi-Resolution Sinusoidal Modeling", Proceedings of the ICASSP, 1999, pp. 805-808.

Jensen et al., "Speech Enhancement Using a Constrained Iterative Sinusoidal Model", IEEE Transactions on Speech & Audio Processing, Oct. 2001, vol. 9, No. 7, pp. 731-739.

* cited by examiner (DIRECT/AMBIENCE)
PRIOR ART (IN-BAND)
PRIOR ART

DEVICE AND METHOD FOR GENERATING A MULTI-CHANNEL SIGNAL INCLUDING SPEECH SIGNAL PROCESSING

BACKGROUND OF THE INVENTION

The present invention relates to the field of audio signal processing and, in particular, to generating several output channels out of fewer input channels, such as, for example, one (mono) channel or two (stereo) input channels.

Multi-channel audio material is becoming more and more popular. This has resulted in many end users meanwhile being in possession of multi-channel reproduction systems. This can mainly be attributed to the fact that DVDs are becoming increasingly popular and that consequently many users of DVDs meanwhile are in possession of 5.1 multi-channel equipment. Reproduction systems of this kind generally consist of three loudspeakers L (left), C (center) and R (right) which are typically arranged in front of the user, and two loudspeakers Ls and Rs which are arranged behind the user, and typically one LFE-channel which is also referred to as low-frequency effect channel or subwoofer. Such a channel scenario is indicated in FIGS. 5*b* and 5*c*. While the loudspeakers L, C, R, Ls, Rs should be positioned with regard to the user as is shown in FIGS. 5*b* and 5*c* in order for the user to receive the best hearing experience possible, the positioning of the LFE channel (not shown in FIGS. 5*b* and 5*c*) is not that decisive since the ear cannot perform localization at such low frequencies, and the LFE channel may consequently be arranged wherever, due to its considerable size, it is not in the way.

Such a multi-channel system exhibits several advantages compared to a typical stereo reproduction which is a two-channel reproduction, as is exemplarily shown in FIG. 5*a*.

Even outside the optimum central hearing position, improved stability of the front hearing experience, which is also referred to as "front image", results due to the center channel. The result is a greater "sweet spot", "sweet spot" representing the optimum hearing position.

Additionally, the listener is provided with an improved experience of "delving into" the audio scene, due to the two back loudspeakers Ls and Rs.

Nevertheless, there is a huge amount of audio material, which users own or is generally available, which only exists as stereo material, i.e. only includes two channels, namely the left channel and the right channel. Compact discs are typical sound carriers for stereo pieces of this kind.

The ITU recommends two options for playing stereo material of this kind using 5.1 multi-channel audio equipment.

This first option is playing the left and right channels using the left and right loudspeakers of the multi-channel reproduction system. However, this solution is of disadvantage in that the plurality of loudspeakers already there is not made use of, which means that the center loudspeaker and the two back loudspeakers present are not made use of advantageously.

Another option is converting the two channels into a multi-channel signal. This may be done during reproduction or by special pre-processing, which advantageously makes use of all six loudspeakers of the 5.1 reproduction system exemplarily present and thus results in an improved hearing experience when two channels are upmixed to five or six channels in an error-free manner.

Only then will the second option, i.e. using all the loudspeakers of the multi-channel system, be of advantage compared to the first solution, i.e. when there are no upmixing errors. Upmixing errors of this kind may be particularly disturbing when signals for the back loudspeakers, which are also known as ambience signals, cannot be generated in an error-free manner.

One way of performing this so-called upmixing process is known under the key word "direct ambience concept". The direct sound sources are reproduced by the three front channels such that they are perceived by the user to be at the same position as in the original two-channel version. The original two-channel version is illustrated schematically in FIG. 5 using different drum instruments.

FIG. 5*b* shows an upmixed version of the concept wherein all the original sound sources, i.e. the drum instruments, are reproduced by the three front loudspeakers L, C and R, wherein additionally special ambience signals are output by the two back loudspeakers. The term "direct sound source" is thus used for describing a tone coming only and directly from a discrete sound source, such as, for example, a drum instrument or another instrument, or generally a special audio object, as is exemplarily illustrated in FIG. 5*a* using a drum instrument. There are no additional tones like, for example, caused by wall reflections etc. in such a direct sound source. In this scenario, the sound signals output by the two back loudspeakers Ls, Rs in FIG. 5*b* are only made up of ambience signals which may be present in the original recording or not. Ambience signals of this kind do not belong to a single sound source, but contribute to reproducing the room acoustics of a recording and thus result in a so-called "delving into" experience by the listener.

Another alternative concept which is referred to as the "in-the-band" concept is illustrated schematically in FIG. 5*c*. Every type of sound, i.e. direct sound sources and ambience-type tones, are all positioned around the listener. The position of a tone is independent of its characteristic (direct sound sources or ambience-type tones) and is only dependent on the specific design of the algorithm, as is exemplarily illustrated in FIG. 5*c*. Thus, it was determined in FIG. 5*c* by the upmix algorithm that the two instruments 1100 and 1102 are positioned laterally relative to the listener, whereas the two instruments 1104 and 1106 are positioned in front of the user. The result of this is that the two back loudspeakers Ls, Rs now also contain portions of the two instruments 1100 and 1102 and no longer ambience-type tones only, as has been the case in FIG. 5*b*, where the same instruments are all positioned in front of the user.

The expert publication "C. Avendano and J. M. Jot: "Ambience Extraction and Synthesis from Stereo Signals for Multichannel Audio Upmix", IEEE International Conference on Acoustics, Speech and Signal Processing, ICASSP 02, Orlando, Fla., May 2002" discloses a frequency domain technique of identifying and extracting ambience information in stereo audio signals. This concept is based on calculating an inter-channel coherency and a non-linear mapping function which is to allow determining time-frequency regions in the stereo signal which mainly consists of ambience components. Ambience signals are then synthesized and used for storing the back channels or "surround" channels Ls, Rs (FIGS. 10 and 11) of a multi-channel reproduction system.

In the expert publication "R. Irwan and Ronald M. Aarts: "A method to convert stereo to multi-channel sound", The proceedings of the AES 19$^{th}$ International Conference, Schloss Elmau, Germany, Jun. 21-24, pages 139-143, 2001", a method for converting a stereo signal to a multi-channel signal is presented. The signal for the surround channels is calculated using a cross-correlation technique. A principle component analysis (PCA) is used for calculating a vector indicating a direction of the dominant signal. This vector is then mapped from a two-channel representation to a three-channel-representation in order to generate the three front channels.

All known techniques try in different manners to extract the ambience signals from the original stereo signals or even synthesize same from noise or further information, wherein information which are not in the stereo signal may be used for synthesizing the ambience signals. However, in the end, this is all about extracting information from the stereo signal and/or feeding into a reproduction scenario information which are not present in an explicit form since typically only a two-channel stereo signal and, maybe, additional information and/or meta-information are available.

Subsequently, further known upmixing methods operating without control parameters will be detailed. Upmixing methods of this kind are also referred to as blind upmixing methods.

Most techniques of this kind for generating a so-called pseudo-stereophony signal from a mono-channel (i.e. a 1-to-2 upmix) are not signal-adaptive. This means that they will process a mono-signal in the same manner irrespective of which content is contained in the mono-signal. Systems of this kind frequently operate using simple filtering structures and/or time delays in order to decorrelate the signals generated, exemplarily by processing the one-channel input signal by a pair of so-called complementary comb filters, as is described in M. Schroeder, "An artificial stereophonic effect obtained from using a single signal", JAES, 1957. Another overview of systems of this kind can be found in C. Faller, "pseudo stereophony revisited", Proceedings of the AES 118$^{th}$ Convention, 2005.

Additionally, there is the technique of ambience signal extraction using a non-negative matrix factorization, in particular in the context of a 1-to-N upmix, N being greater than two. Here, a time-frequency distribution (TFD) of the input signal is calculated, exemplarily by means of a short-time Fourier transform. An estimated value of the TFD of the direct signal components is derived by means of a numerical optimizing method which is referred to as non-negative matrix factorization. An estimated value for the TFD of the ambience signal is determined by calculating the difference of the TFD of the input signal and the estimated value of the TFD for the direct signal. Re-synthesis or synthesis of the time signal of the ambience signal is performed using the phase spectrogram of the input signal. Additional post-processing is performed optionally in order to improve the hearing experience of the multi-channel signal generated. This method is described in detail by C. Uhle, A. Walther, O. Hellmuth and J. Herre in "Ambience separation from mono recordings using non-negative matrix factorization", Proceedings of the AES 30$^{th}$ Conference 2007.

There are different techniques for upmixing stereo recordings. One technique is using matrix decoders. Matrix decoders are known under the key word Dolby Pro Logic II, DTS Neo: 6 or HarmanKardon/Lexicon Logic 7 and contained in nearly every audio/video receiver sold nowadays. As a byproduct of their intended functionality, these methods are also able to perform blind upmixing. These decoders use inter-channel differences and signal-adaptive control mechanisms for generating multi-channel output signals.

As has already been discussed, frequency domain techniques as described by Avendano and Jot are used for identifying and extracting the ambience information in stereo audio signals. This method is based on calculating an inter-channel coherency index and a non-linear mapping function, thereby allowing determining the time-frequency regions which consist mostly of ambience signal components. The ambience signals are then synthesized and used for feeding the surround channels of the multi-channel reproduction system.

One component of the direct/ambience upmixing process is extracting an ambience signal which is fed into the two back channels Ls, Rs. There are certain requirements to a signal in order for it to be used as an ambience-time signal in the context of a direct/ambience upmixing process. One prerequisite is that relevant parts of the direct sound sources should not be audible in order for the listener to be able to localize the direct sound sources safely as being in front. This will be of particular importance when the audio signal contains speech or one or several distinguishable speakers. Speech signals which are, in contrast, generated by a crowd of people do not have to be disturbing for the listener when they are not localized in front of the listener.

If a special amount of speech components was to be reproduced by the back channels, this would result in the position of the speaker or of the few speakers to be placed from the front to the back or in a certain distance to the user or even behind the user, which results in a very disturbing sound experience. In particular, in a case in which audio and video material are presented at the same time, such as, for example, in a movie theater, such an experience is particularly disturbing.

One basic prerequisite for the tone signal of a movie (of a sound track) is for the hearing experience to be in conformity with the experience generated by the pictures. Audible hints as to localization thus should not be contrary to visible hints as to localization. Consequently, when a speaker is to be seen on the screen, the corresponding speech should also be placed in front of the user.

The same applies for all other audio signals, i.e. this is not limited to situations, wherein audio signals and video signals are presented at the same time. Other audio signals of this kind are, for example, broadcasting signals or audio books. A listener is used to speech being generated by the front channels and would probably, when all of a sudden speech was to come from the back channels, turn around to restore his conventional experience.

In order to improve the quality of the ambience signals, the German patent application DE 102006017280.9-55 suggests subjecting an ambience signal once extracted to a transient detection and causing transient suppression without considerable losses in energy in the ambience signal. Signal substitution is performed here in order to substitute regions including transients by corresponding signals without transients, however, having approximately the same energy.

The AES Convention Paper "Descriptor-based spatialization", J. Monceaux, F. Pachet et al., May 28-31, 2005, Barcelona, Spain, discloses a descriptor-based spatialization wherein detected speech is to be attenuated on the basis of extracted descriptors by switching only the center channel to be mute. A speech extractor is employed here. Action and transient times are used for smoothing modifications of the output signal. Thus, a multi-channel soundtrack without speech may be extracted from a movie. When a certain stereo reverberation characteristic is present in the original stereo downmix signal, this results in an upmixing tool to distribute this reverberation to every channel except for the center channel so that reverberation can be heard. In order to prevent this, dynamic level control is performed for L, R, Ls and Rs in order to attenuate reverberation of a voice.

SUMMARY

According to an embodiment, a device for generating a multi-channel signal having a number of output channel signals greater than a number of input channel signals of an input signal, the number of input channel signals equaling one or greater, may have: an upmixer for upmixing the input signal having a speech portion in order to provide at least a direct channel signal and at least an ambience channel signal having a speech portion; a speech detector for detecting a section of the input signal, the direct channel signal or the ambience channel signal in which the speech portion occurs; and a signal modifier for modifying a section of the ambience channel signal which corresponds to that section having been detected by the speech detector in order to obtain a modified ambience channel signal in which the speech portion is attenuated or eliminated, the section in the direct channel signal being attenuated to a lesser extent or not at all; and loudspeaker signal output means for outputting loudspeaker signals in a reproduction scheme using the direct channel and the modified ambience channel signal, the loudspeaker signals being the output channel signals.

According to another embodiment, a method for generating a multi-channel signal having a number of output channel signals greater than a number of input channel signals of an input signal, the number of input channel signals equaling one or greater, may have the ste of: upmixing the input signal to provide at least a direct channel signal and at least an ambience channel signal; detecting a section of the input signal, the direct channel signal or the ambience channel signal in which a speech portion occurs; and modifying a section of the ambience channel signal which corresponds to that section having been detected in the step of detecting in order to obtain a modified ambience channel signal in which the speech portion is attenuated or eliminated, the section in the direct channel signal being attenuated to a lesser extent or not at all; and outputting loudspeaker signals in a reproduction scheme using the direct channel and the modified ambience channel signal, the loudspeaker signals being the output channel signals.

Another embodiment may have a computer program having a program code for executing the method for generating a multi-channel signal as mentioned above, when the program code runs on a computer.

The present invention is based on the finding that speech components in the back channels, i.e. in the ambience channels, are suppressed in order for the back channels to be free from speech components. An input signal having one or several channels is upmixed to provide a direct signal channel and to provide an ambience signal channel or, depending on the implementation, the modified ambience signal channel already. A speech detector is provided for searching for speech components in the input signal, the direct channel or the ambience channel, wherein speech components of this kind may exemplarily occur in temporal and/or frequency portions or also in components of orthogonal resolution. A signal modifier is provided for modifying the direct signal generated by the upmixer or a copy of the input signal so as to suppress the speech signal components there, whereas the direct signal components are attenuated to a lesser extent or not at all in the corresponding portions which include speech signal components. Such a modified ambience channel signal is then used for generating loudspeaker signals for corresponding loudspeakers.

However, when the input signal has been modified, the ambience signal generated by the upmixer is used directly, since the speech components are suppressed there already, since the underlying audio signal, too, did have suppressed speech components. In this case, however, when the upmixing process also generates a direct channel, the direct channel is not calculated on the basis of the modified input signal, but on the basis of the unmodified input signal, in order to achieve the speech components to be suppressed selectively, only in the ambience channel, but not in the direct channel where the speech components are explicitly desired.

This prevents reproduction of speech components to take place in the back channels or ambience signal channels, which would otherwise disturb or even confuse the listener. Consequently, the invention ensures dialogs and other speech understandable by a listener, i.e. which is of a spectral characteristic typical of speech, to be placed in front of the listener.

The same requirements also apply for the in-band concept, wherein it is also desirable for direct signals not to be placed in the back channels, but in front of the listener and, maybe, laterally from the listener, but not behind the listener, as is shown in FIG. 5*c* where the direct signal components (and ambience signal components, too) are all placed in front of the listener.

In accordance with the invention, signal-dependent processing is performed in order to remove or suppress the speech components in the back channels or in the ambience signal. Two basic ste are performed here, namely detecting speech occurring and suppressing speech, wherein detecting speech occurring may be performed in the input signal, in the direct channel or in the ambience channel, and wherein suppressing speech may be performed directly in the ambience channel or indirectly in the input signal which will then be used for generating the ambience channel, wherein this modified input signal is not used for generating the direct channel.

The invention thus achieves that when a multi-channel surround signal is generated from an audio signal having fewer channels, the signal containing speech components, it is ensured that the resulting signals for the, from the user's point of view, back channels include a minimum amount of speech in order to retain the original tone-image in front of the user (front-image). When a special amount of speech components was to be reproduced by the back channels, the speaker's position would be positioned outside the front region, anywhere between the listener and the front loudspeakers or, in extreme cases, even behind the listener. This would result in a very disturbing sound experience, in particular when the audio signals are presented simultaneously with visual signals, as is, for example, the case in movies. Thus, many multi-channel movie sound tracks hardly contain any speech components in the back channels. In accordance with the invention, speech signal components are detected and suppressed where appropriate.

Other elements, features, steps, characteristics and advantages of the present invention will become more apparent from the following detailed description of the preferred embodiments with reference to the attached drawings.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
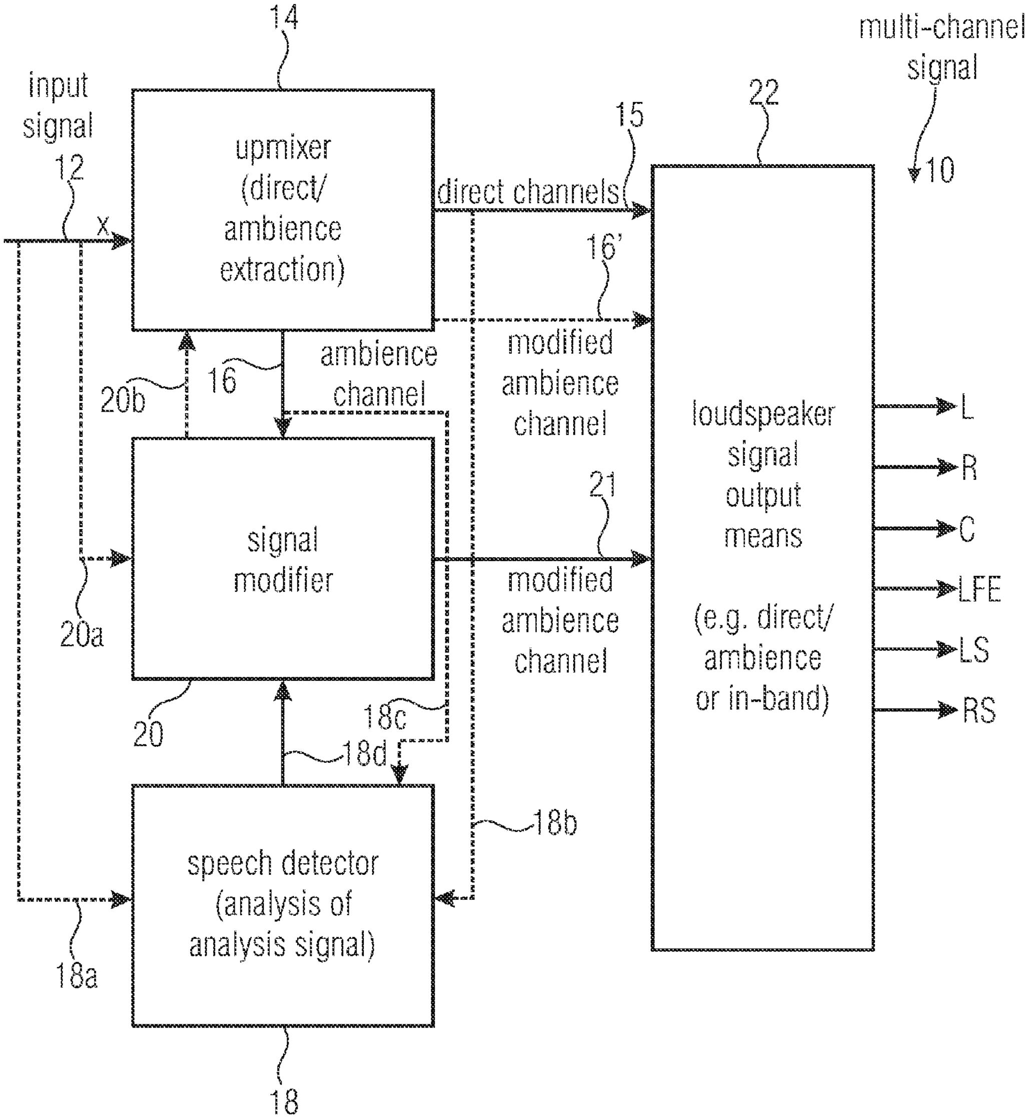
FIG. 1 shows a block diagram of an embodiment of the present invention.

FIG. 1 shows a block diagram of a device for generating a multi-channel signal 10, which is shown in FIG. 1 as comprising a left channel L, a right channel R, a center channel C, an LFE channel, a back left channel LS and a back right channel RS. It is pointed out that the present invention, however, is also appropriate for any representations other than the 5.1 representation selected here, such as, for example, a 7.1 representation or even 3.0 representation, wherein only a left channel, a right channel and a center channel are generated here. The multi-channel signal 10 which exemplarily comprises six channels shown in FIG. 1 is generated from an input signal 12 or "x" comprising a number of input channels, the number of input channels equaling 1 or being greater than 1 and exemplarily equaling 2 when a stereo downmix is input. Generally, however, the number of output channels is greater than the number of input channels.

The device shown in FIG. 1 includes an upmixer 14 for upmixing the input signal 12 in order to generate at least a direct signal channel 15 and an ambience signal channel 16 or, maybe, a modified ambience signal channel 16'. Additionally, a speech detector 18 is provided which is implemented to use the input signal 12 as an analysis signal, as is provided at 18*a*, or to use the direct signal channel 15, as is provided at 18*b*, or to use another signal which, with regard to the temporal/frequency occurrence or with regard to its characteristic concerning speech components is similar to the input signal 12. The speech detector detects a section of the input signal, the direct channel or, exemplarily, the ambience channel, as is illustrated at 18*c*, where a speech portion is present. This speech portion may be a significant speech portion, i.e. exemplarily a speech portion the speech characteristic of which has been derived in dependence on a certain qualitative or quantitative measure, the qualitative measure and the quantitative measure exceeding a threshold which is also referred to as speech detection threshold.

With a quantitative measure, a speech characteristic is quantized using a numerical value and this numerical value is compared to a threshold. With a qualitative measure, a decision is made per section, wherein the decision may be made relative to one or several decision criteria. Decision criteria of this kind may exemplarily be different quantitative characteristics which may be compared among one another/weighted or processed somehow in order to arrive at a yes/no decision.

The device shown in FIG. 1 additionally includes a signal modifier 20 implemented to modify the original input signal, as is shown at 20*a*, or implemented to modify the ambience channel 16. When the ambience channel 16 is modified, the signal modifier 20 outputs a modified ambience channel 21, whereas when the input signal 20*a* is modified, a modified input signal 20*b* is output to the upmixer 14, which then generates the modified ambience channel 16', like for example by same upmixing process having been used for the direct channel 15. Should this upmixing process, due to the modified input signal 20*b*, also result in a direct channel, this direct channel would be dismissed since, in accordance with the invention, a direct channel having been derived from the unmodified input signal 12 (without speech suppression) and not the modified input signal 20*b* is used as direct channel.

The signal modifier is implemented to modify sections of the at least one ambience channel or the input signal, wherein these sections may exemplarily be temporal or frequency sections or portions of an orthogonal resolution. In particular, the sections corresponding to the sections having been detected by the speech detector are modified such that the signal modifier, as has been illustrated, generates the modified ambience channel 21 or the modified input signal 20*b* in which a speech portion is attenuated or eliminated, wherein the speech portion has been attenuated to a lesser extent or, optionally, not at all in the corresponding section of the direct channel.

In addition, the device shown in FIG. 1 includes loudspeaker signal output means 22 for outputting loudspeaker signals in a reproduction scenario, such as, for example, the 5.1 scenario exemplarily shown in FIG. 1, wherein, however, a 7.1 scenario, a 3.0 scenario or another or even higher scenario is also possible. In particular, the at least one direct channel and the at least one modified ambience channel are used for generating the loudspeaker signals for a reproduction scenario, wherein the modified ambience channel may originate from either the signal modifier 20, as is shown at 21, or the upmixer 14, as is shown at 16'.

Figure 5A:
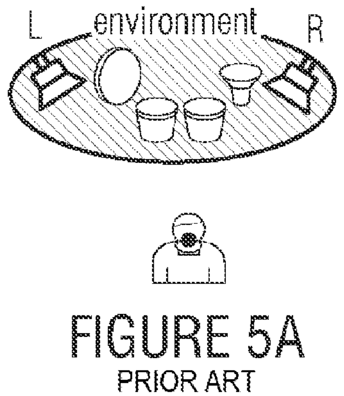
FIGURE 5A PRIOR ART
FIG. 5*a* shows a stereo reproduction scenario including direct sources (drum instruments) and diffuse components.
Figure 5B:
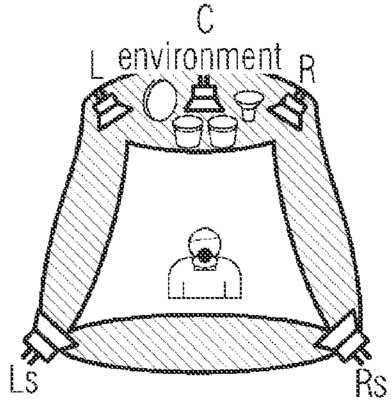
FIG. 5*b* shows a multi-channel reproduction scenario wherein all the direct sound sources are reproduced by the front channels and diffuse components are reproduced by all the channels, this scenario also being referred to as direct ambience concept.

When exemplarily two modified ambience channels 21 are provided, these two modified ambience channels could be fed directly into the two loudspeaker signals Ls, Rs, whereas the direct channels are fed only into the three front loudspeakers L, R, C, so that a complete division has taken place between ambience signal components and direct signal components. The direct signal components will then all be in front of the user and the ambience signal components will all be behind the user. Alternatively, ambience signal components may also be introduced into the front channels at smaller a percentage typically so that the result will be the direct/ambience scenario shown in FIG. 5*b*, wherein ambience signals are not generated only by surround channels, but also by the front loudspeakers, such as, for example, L, C, R.

Figure 5C:
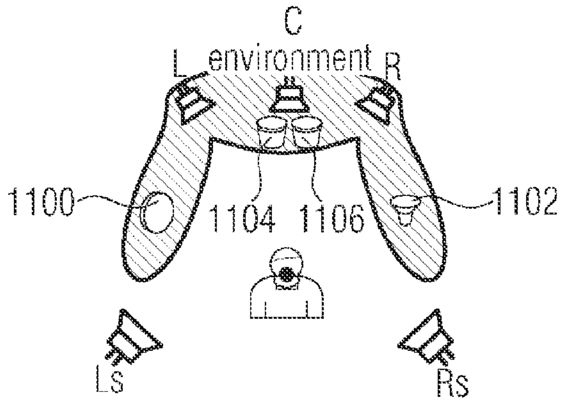
FIG. 5*c* shows a multi-channel reproduction scenario wherein discrete sound sources can also at least partly be reproduced by the back channels, and wherein ambience channels are not reproduced by the back loudspeakers or to a lesser extent than in FIG. 5*b;*

When, however, the in-band scenario is used, ambience signal components will also mainly be output by the front loudspeakers, such as, for example, L, R, C, wherein direct signal components, however, may also be fed at least partly into the two back loudspeakers Ls, Rs. In order to be able to place the two direct signal sources 1100 and 1102 in FIG. 5*c* at the locations indicated, the portion of the source 1100 in the loudspeaker L will roughly be as great as in the loudspeaker Ls, in order for the source 1100 to be placed in the center between L and Ls, in accordance with a typical panning rule. The loudspeaker signal output means 22 may, depending on the implementation, cause direct passing through of a channel fed on the input side or may map the ambience channels and direct channels, such as, for example, by an in-band concept or a direct/ambience concept, such that the channels are distributed to the individual loudspeakers, and in the end the portions from the individual channels may be summed up to generate the actual loudspeaker signal.

Figure 2:
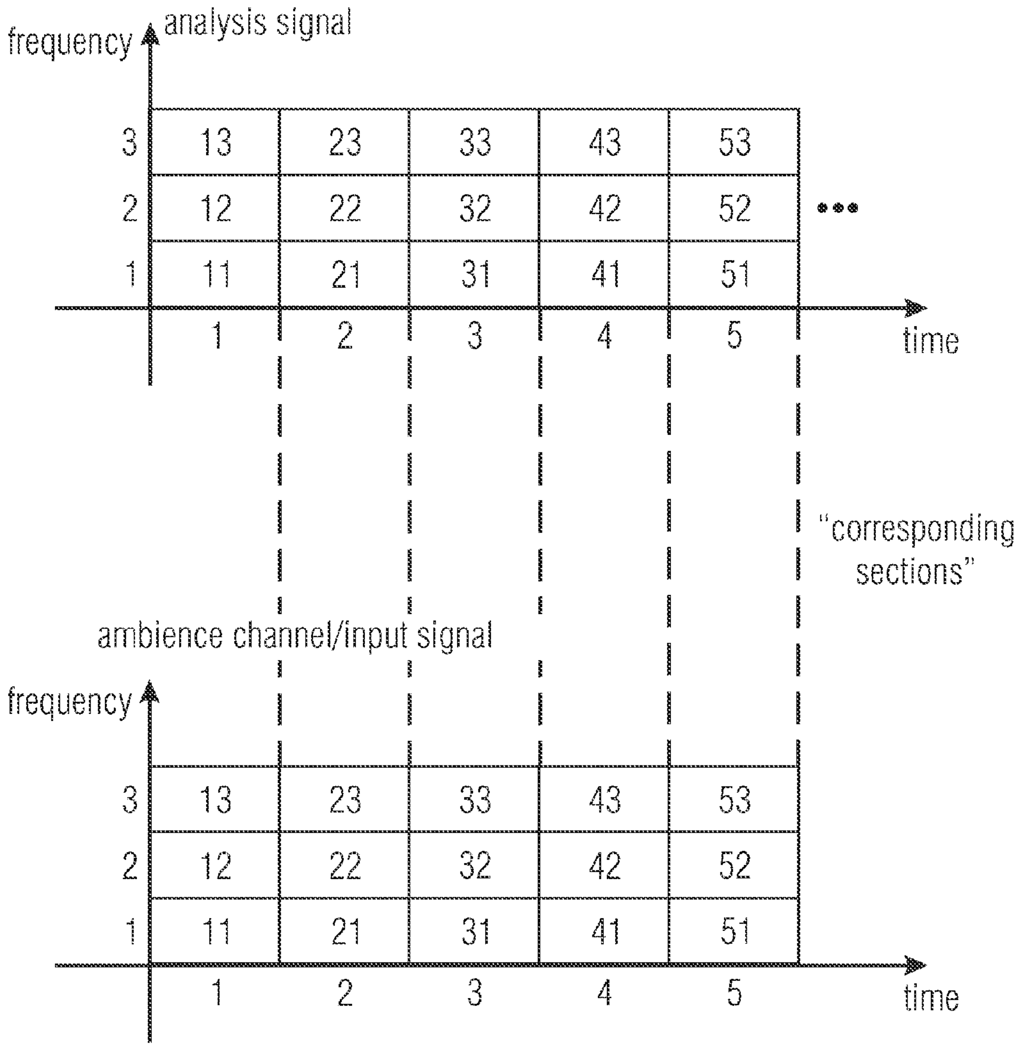
FIG. 2 shows an association of time/frequency sections of an analysis signal and an ambience channel or input signal for discussing the "corresponding sections"

FIG. 2 shows a time/frequency distribution of an analysis signal in the top part and of an ambience channel or input signal in the lower part. In particular, time is plotted along the horizontal axis and frequency is plotted along the vertical axis. This means that in FIG. 2, for each signal 15, there are time/frequency tiles or time/frequency sections which have the same number in both the analysis signal and the ambience channel/input signal. This means that the signal modifier 20, for example when the speech detector 18 detects a speech signal in the portion 22, will process the section of the ambience channel/input signal somehow, such as, for example, attenuate, completely eliminate or substitute same by a synthesis signal not comprising a speech characteristic. It is to be pointed out that, in the present invention, the distribution need not be that selective as is shown in FIG. 2. Instead, temporal detection may already provide a satisfying effect, wherein a certain temporal section of the analysis signal, exemplarily from second 2 to second 2.1, is detected as containing a speech signal, in order to then process the section of the ambience channel or input signal also between second 2 and second 2.1, in order to obtain speech suppression.

Alternatively, an orthogonal resolution may also be performed, such as, for example, by means of a principle component analysis, wherein in this case the same component distribution will be used, both in the ambience channel or input signal and in the analysis signal. Certain components having been detected in the analysis signal as speech components are attenuated or suppressed completely or eliminated in the ambience channel or input signal. Depending on the implementation, a section will be detected in the analysis signal, this section not being processed in the analysis signal but, maybe, also in another signal.

Figure 3:
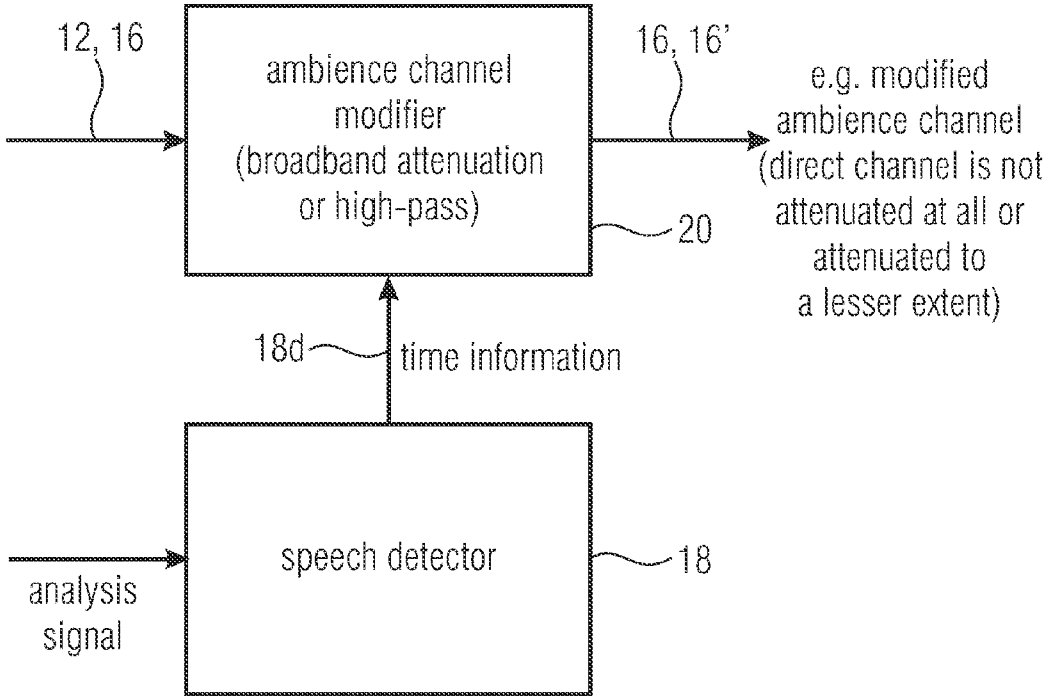
FIG. 3 shows ambience signal modification in accordance with an embodiment of the present invention.

FIG. 3 shows an implementation of a speech detector in cooperation with an ambience channel modifier, the speech detector only providing time information, i.e., when looking at FIG. 2, only identifying, in a broad-band manner, the first, second, third, fourth or fifth time interval and communicating this information to the ambience channel modifier 20 via a control line 18*d* (FIG. 1). The speech detector 18 and the ambience channel modifier 20 which operate synchronously or operate in a buffered manner together achieve the speech signal or speech component to be attenuated in the signal to be modified, which may exemplarily be the signal 12 or the signal 16, whereas it is made sure that such an attenuation of the corresponding section will not occur in the direct channel or only to a lesser extent. Depending on the implementation, this may also be achieved by the upmixer 14 operating without considering speech components, such as, for example, in a matrix method or in another method which does not perform special speech processing. The direct signal achieved by this is then fed to the output means 22 without further processing, whereas the ambience signal is processed with regard to speech suppression.

Alternatively, when the signal modifier subjects the input signal to speech suppression, the upmixer 14 may in a way operate twice in order to extract the direct channel component on the basis of the original input signal on the one hand, but also to extract the modified ambience channel 16' on the basis of the modified input signal 20*b*. The same upmixing algorithm would occur twice, however, using a respective other input signal, wherein the speech component is attenuated in the one input signal and the speech component is not attenuated in the other input signal.

Depending on the implementation, the ambience channel modifier exhibits a functionality of broad-band attenuation or a functionality of high-pass filtering, as will be explained subsequently.

Subsequently, different implementations of the inventive device will be explained referring to FIGS. 6*a*, 6*b*, 6*c* and 6*d*.

Figure 6A:
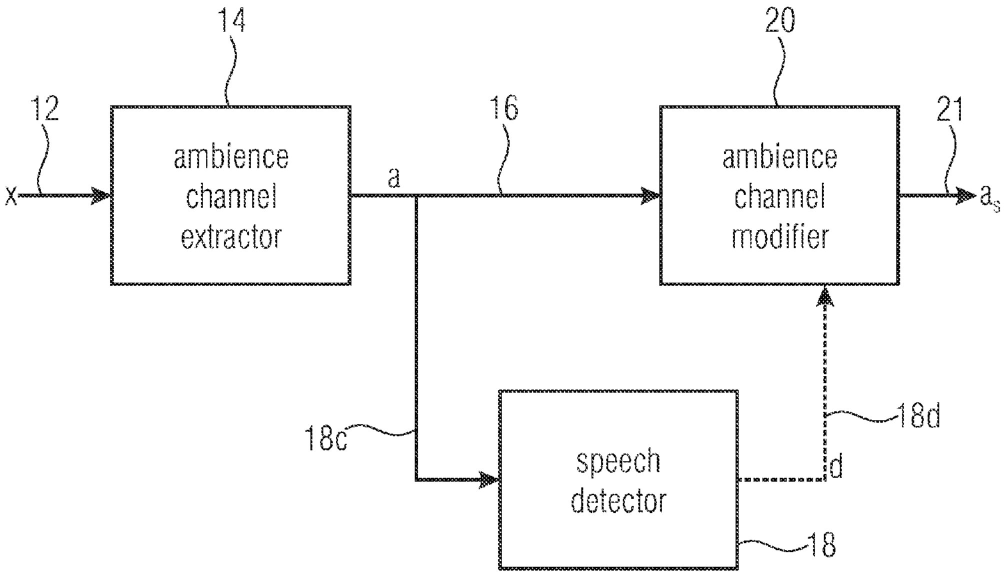
FIG. 6*a* shows another embodiment including speech detection in the ambience channel and modification of the ambience channel.

In FIG. 6*a*, the ambience signal a is extracted from the input signal x, this extraction being part of the functionality of the upmixer 14. Speech occurring in the ambience signal a is detected. The result of the detection d is used in the ambience channel modifier 20 calculating the modified ambience signal 21, in which speech portions are suppressed.

Figure 6B:
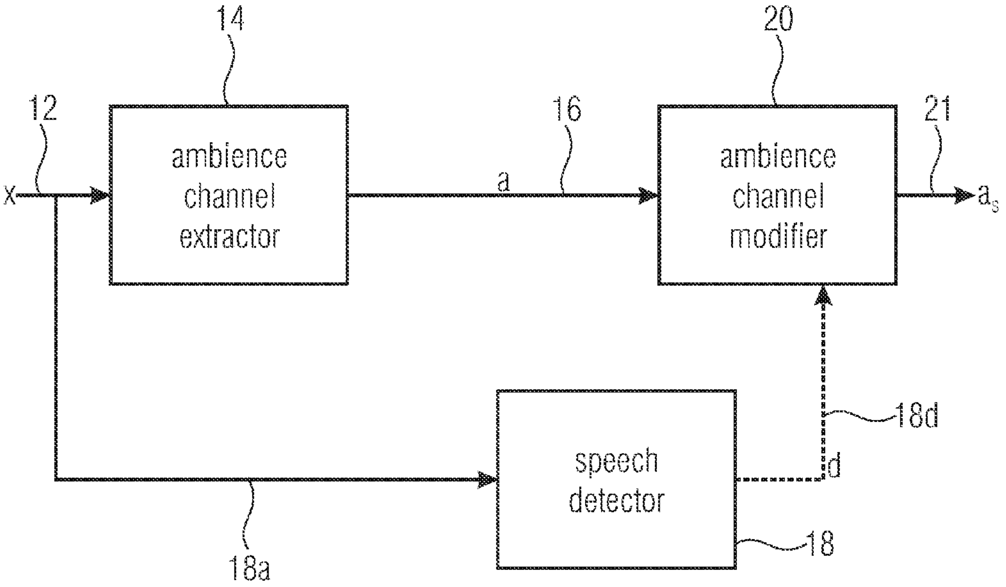
FIG. 6*b* shows an embodiment including speech detection in the input signal and modification of the ambience channel.

FIG. 6*b* shows a configuration which differs from FIG. 6*a* in that the input signal and not the ambience signal is fed to the speech detector 18 as analysis signal 18*a*. In particular, the modified ambience channel signal $a_s$ is calculated similarly to the configuration of FIG. 6*a*, however, speech in the input signal is detected. This can be explained by the fact that speech components are generally easier to be found in the input signal x than in the ambience signal a. Thus, improved reliability can be achieved by the configuration shown in FIG. 6*b*.

Figure 6C:
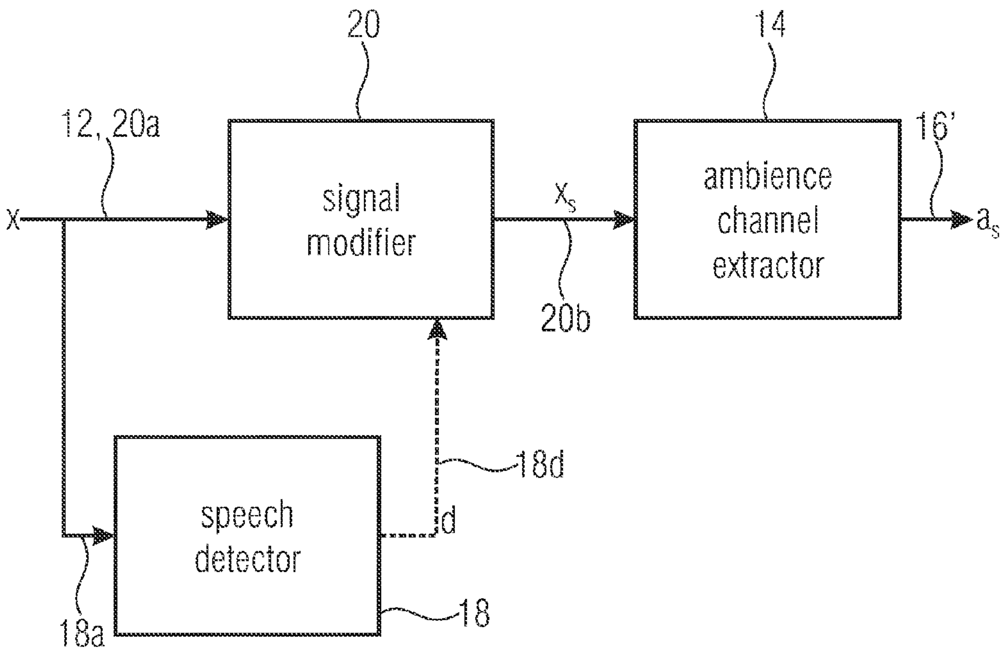
FIG. 6*c* shows an embodiment including speech detection in the input signal and modification of the input signal.

In FIG. 6*c*, the speech-modified ambience signal $a_s$ is extracted from a version $x_s$ of the input signal which has already been subjected to speech signal suppression. Since the speech components in x are typically more prominent than in an extracted ambience signal, suppressing same can be done in a manner which is safer and more lasting than in FIG. 6*a*. The disadvantage in the configuration shown in FIG. 6*c* compared to the configuration in FIG. 6*a* is that potential artifacts of speech suppression and ambience extraction process may, depending on the type of the extraction method, be aggravated. However, in FIG. 6*c*, the functionality of the ambience channel extractor 14 is used only for extracting the ambience channel from the modified audio signal. However, the direct channel is not extracted from the modified audio signal $x_s$ (20*b*), but on the basis of the original input signal x (12).

Figure 6D:
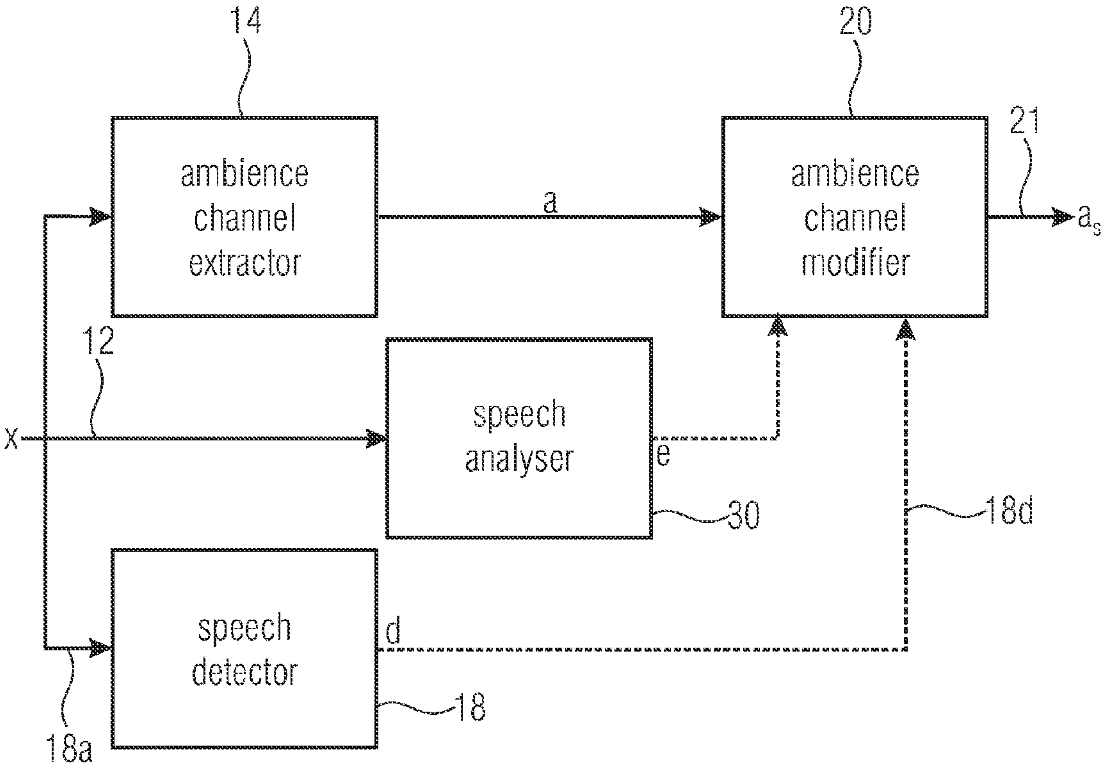
FIG. 6*d* shows another embodiment including speech detection in the input signal and modification in the ambience signal, the modification being tuned specially to speech.

In the configuration shown in FIG. 6*d*, the ambience signal a is extracted from the input signal x by the upmixer. Speech occurring in the input signal x is detected. Additionally, additional side information e which additionally control the functionality of the ambience channel modifier 20 are calculated by a speech analyzer 30. These side information are calculated directly from the input signal and may be the position of speech components in a time/frequency representation, exemplarily in the form of a spectrogram of FIG. 2, or may be further additional information which will be explained in greater detail below.

The functionality of the speech detector 18 will be detailed below. The object of speech detection is analyzing a mixture of audio signals in order to estimate a probability of speech being present. The input signal may be a signal which may be assembled of a plurality of different types of audio signals, exemplarily of a music signal, of noise or of special tone effects as are known from movies. One way of detecting speech is employing a pattern recognition system. Pattern recognition means analyzing raw data and performing special processing based on a category of a pattern which has been discovered in the raw data. In particular, the term "pattern" describes an underlying similarity to be found between measurements of objects of equal categories (classes). The basic operations of a pattern recognition system are detection, i.e. recording of data using a converter, preprocessing, extraction of features and classification, wherein these basic operations may be performed in the order indicated.

Usually, microphones are employed as sensors for a speech detection system. Preparation may be A/D conversion, resampling or noise reduction. Extracting features means calculating characteristic features for each object from the measurements. The features are selected such that they are similar among objects of the same class, i.e. such that good intra-class compactness is achieved and such that these are different for objects of different classes, so that inter-class separability can be achieved. A third requirement is that the features should be robust relative to noise, ambience conditions and transformations of the input signal irrelevant for human perception. Extracting the characteristics may be divided into two separate stages. The first stage is calculating the features and the second stage is projecting or transforming the features onto a generally orthogonal basis in order to minimize a correlation between characteristic vectors and reduce dimensionality of features by not using elements of low energy.

Classification is the process of deciding whether there is speech or not, based on the extracted features and a trained classifier. The following equation be given:

$$\Omega_{XY}=\{(x_1,y_1), \ldots, (x_l,y_l)\}, x_i \in \mathbb{R}^n, y \in Y=\{1, \ldots c\}$$

In the above equation, a quantity of training vectors $\Omega_{xy}$ is defined, feature vectors being referred to by $x_i$ and the set of classes by Y. This means that for basic speech detection, Y has two values, namely {speech, non-speech}.

In the training phase, the features $x_y$ are calculated from designated data, i.e. audio signals of which is known which class y they belong to. After finishing training, the classifier has learned the features of all classes.

In the phase of applying the classifier, the features are calculated and projected from the unknown data, like in the training phase, and classified by the classifier based on the knowledge on the features of the classes, as learned in training.

Special implementations of speech suppression, as may exemplarily be performed by the signal modifier 20, will be detailed below. Thus, different methods may be employed for suppressing speech in an audio signal. There are methods which are not known from the field of speech amplification and noise reduction for communication applications. Originally, speech amplification methods were used to amplify speech in a mixture of speech and background noise. Methods of this kind may be modified so as to cause the contrary, namely suppressing speech, as is performed for the present invention.

There are solution approaches for speech amplification and noise reduction which attenuate or amplify the coefficients of a time/frequency representation in accordance with an estimated value of the degree of noise contained in such a time/frequency coefficient. When no additional information on background noise are known, such as, for example, a-priori information or information measured by a special noise sensor, a time/frequency representation is obtained from a noise-infested measurement, exemplarily using special minimum statistics methods. A noise suppression rule calculates an attenuation factor using the estimated noise value. This principle is known as short-term spectral attenuation or spectral weighting, as is exemplarily known from G. Schmid, "Single-channel noise suppression based on spectral weighting", Eurasip Newsletter 2004. Spectral subtraction, Wiener-Filtering and the Ephraim-Malah algorithm are signal processing methods operating in accordance with the short-time spectral attenuation (STSA) principle. A more general formulation of the STSA approach results in a signal subspace method, which is also known as reduced-rank method and described in P. Hansen and S. Jensen, "Fir filter representation of reduced-rank noise reduction", IEEE TSP, 1998.

In principle, all the methods which amplify speech or suppress non-speech components may, in a reversed manner of usage with regard to the known usage thereof, be used to suppress speech and/or amplify non-speech. The general model of speech amplification or noise suppression is the fact that the input signal is a mixture of a desired signal (speech) and the background noise (non-speech). Suppressing the speech is, for example, achieved by inverting the attenuation factors in an STSA-based method or by exchanging the definitions of the desired signal and the background noise.

However, an important requirement in speech suppression is that, with regard to the context of upmixing, the resulting audio signal is perceived as an audio signal of high audio quality. One knows that speech improvement methods and noise reduction methods introduce audible artifacts into the output signal. An example of artifacts of this kind is known as music noise or music tones and results from an error-prone estimation of noise floors and varying sub-band attenuation factors.

Alternatively, blind source separation methods may also be used for separating the speech signal portions from the ambient signal and for subsequently manipulating these separately.

However, certain methods, which are detailed subsequently, are advantageous for the special requirement of generating high-quality audio signals, due to the fact that, compared to other methods, they do considerably better. One method is broad-band attenuation, as is indicated in FIG. 3 at 20. The audio signal is attenuated in time intervals where there is speech. Special amplification factors are in a range between −12 dB and −3 dB, an attenuation being at 6 decibel. Since other signal components/portions may also be suppressed, one might assume that the entire loss in audio signal energy is perceived clearly. However, it has been found out that this effect is not disturbing, since the user concentrates in particular on the front loudspeakers L, C, R. anyway when a speech sequence begins so that the user will not experience the reduction in energy of the back channels or the ambience signal when he or she is concentrating on a speech signal. This is particularly boosted by the further typical effect that the audio signal level will increase anyway due to speech setting in. By introducing an attenuation in a range between −12 decibel and 3 decibel, the attenuation is not experienced as being disturbing. Instead, the user will find it considerably more pleasant that, due to the suppression of speech components in the back channels, an effect resulting in the speech components, for the user, being positioned exclusively in the front channels is achieved.

An alternative method which is also indicated in FIG. 3 at 20, is high-pass filtering. The audio signal is subjected to high-pass filtering where there is speech, wherein a cutoff frequency is in a range between 600 Hz and 3000 Hz. The setting for the cutoff frequency results from the signal characteristic of speech with regard to the present invention. The long-term power spectrum of a speech signal is concentrated at a range below 2.5 kHz. The range of the fundamental frequency of voiced speech is in a range between 75 Hz and 330 Hz. A range between 60 Hz and 250 Hz results for male adults. Mean values for male speakers are at 120 Hz and for female speakers at 215 Hz. Due to the resonance in the vocal tract, certain signal frequencies are amplified. The corresponding peaks in the spectrum are also referred to as formant frequencies or simply as formants. Typically, there are roughly three significant formants below 3500 Hz. Consequently, speech exhibits a 1/F nature, i.e. the spectral energy decreases with an increasing frequency. Thus, for purposes of the present invention, speech components may be filtered well by high-pass filtering including the cutoff frequency range indicated.

Figure 4:
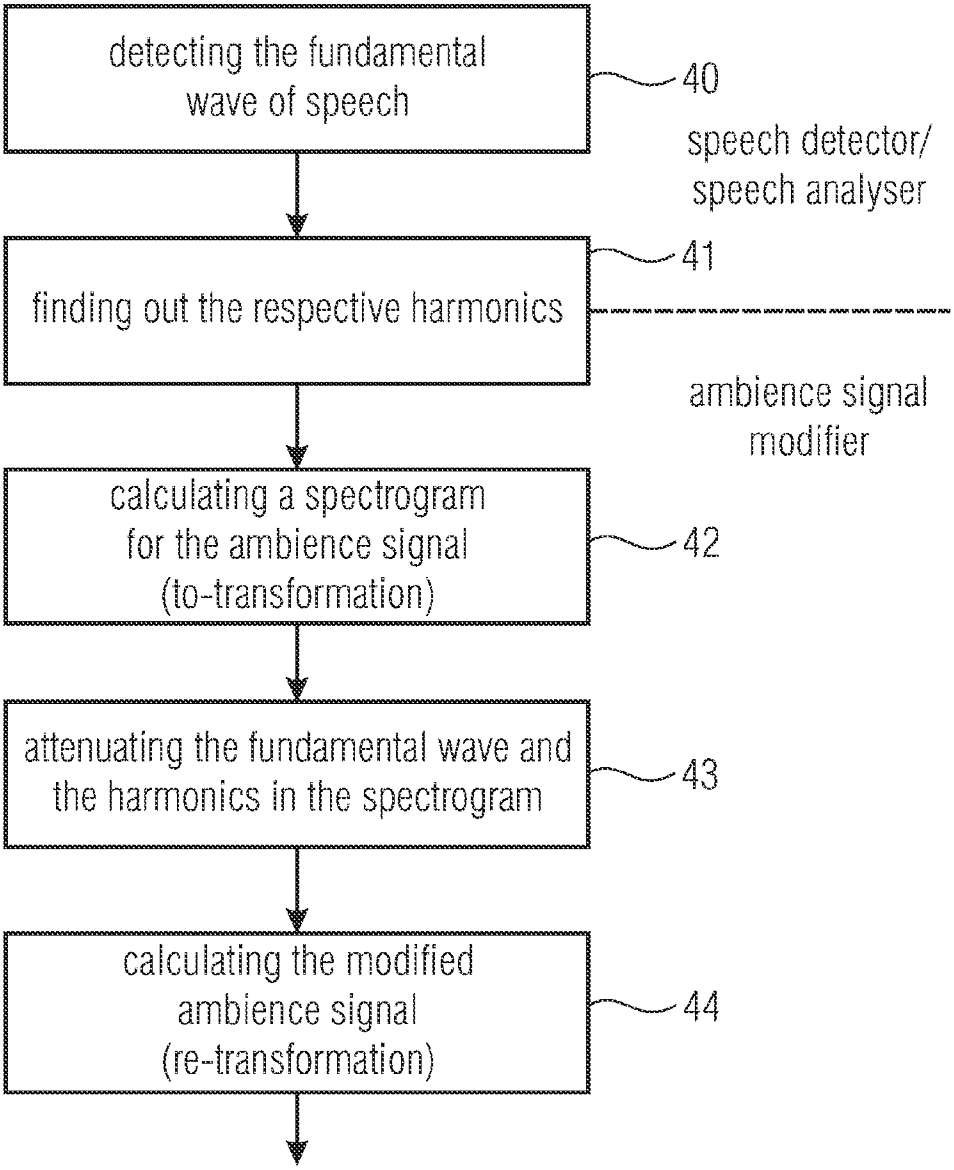
FIG. 4 shows cooperation between a speech detector and an ambience signal modifier in accordance with another embodiment of the present invention.

Another implementation is sinusoidal signal modeling, which is illustrated referring to FIG. 4. In a first step 40, the fundamental wave of speech is detected, wherein this detection may be performed in the speech detector 18 or, as is shown in FIG. 6*e*, in the speech analyzer 30. Following that, in step 41, analysis is performed to find out harmonics belonging to the fundamental wave. This functionality may be performed in the speech detector/speech analyzer or even in the ambience signal modifier already. Subsequently, a spectrogram is calculated for the ambience signal, on the basis of a to-transformation block after block, as is illustrated at 42. Subsequently, the actual speech suppression is performed in step 43 by attenuating the fundamental wave and the harmonics in the spectrogram. In step 44, the modified ambience signal in which the fundamental wave and the harmonics are attenuated or eliminated is subjected to re-transformation in order to obtain the modified ambience signal or the modified input signal.

This sinusoidal signal modeling is frequently employed for tone synthesis, audio encoding, source separation, tone manipulation and noise suppression. A signal is represented here as an assembly made of sinusoidal waves of time-varying amplitudes and frequencies. Voiced speech signal components are manipulated by identifying and modifying the partial tones, i.e. the fundamental wave and the harmonics thereof.

The partial tones are identified by means of a partial tone finder, as is illustrated at 41. Typically, partial tone finding is performed in the time/frequency domain. A spectrogram is done by means of a short-term Fourier transform, as is indicated at 42. Local maximums are detected in each spectrum of the spectrogram and trajectories are determined by local maximums of neighboring spectra. Estimating the fundamental frequency may support the peak picking process, this estimation of the fundamental frequency being performed at 40. A sinusoidal signal representation may then be obtained from the trajectories. It is to be pointed out that the order between ste

40, 41 and step 42 may also be varied such that to-transformation 42, which is performed in the speech analyzer 30 in FIG. 6*d*, will take place first.

Different developments of deriving a sinusoidal signal representation have been suggested. A multi-resolution processing approach for noise reduction is illustrated in D. Andersen and M. Clements, "Audio signal noise reduction using multiresolution sinusoidal modeling", Proceedings of ICASSP 1999. An iterative process for deriving the sinusoidal representation has been presented in J. Jensen and J. Hansen, "Speech enhancement using a constrained iterative sinusoidal model", IEEE TSAP 2001.

Using the sinusoidal signal representation, an improved speech signal is obtained by amplifying the sinusoidal component. The inventive speech suppression, however, aims at achieving the contrary, namely suppressing the partial tones, the partial tones including the fundamental wave and the harmonics thereof, for a speech segment including voiced speech. Typically, speech components of high energy are of a tonal nature. Thus, speech is at a level of 60-75 decibel for vocals and roughly 20-30 decibels lower for consonants. Exciting a periodic pulse-type signal is for voiced speech (vocals). The excitation signal is filtered by the vocal tract. Consequently, nearly all the energy of a voiced speech segment is concentrated in the fundamental wave and the harmonics thereof. When suppressing these partial tones, speech components are suppressed significantly.

Figure 7:
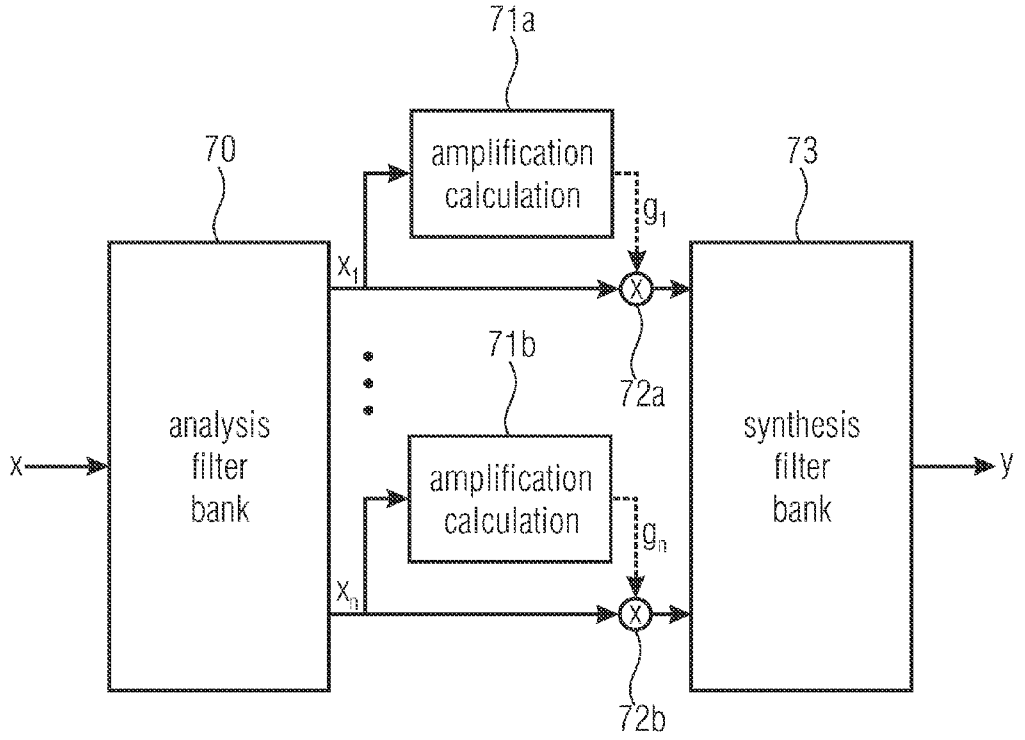
FIG. 7 shows an embodiment including amplification factor calculation band after band, based on a bandpass signal/sub-band signal.
Figure 8:
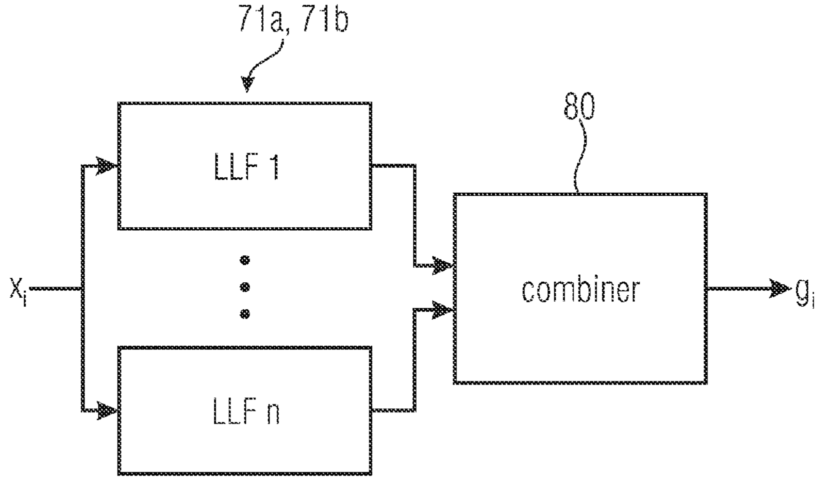
FIG. 8 shows a detailed illustration of an amplification calculation block of FIG. 7.

Another way of achieving speech suppression is illustrated in FIGS. 7 and 8. FIGS. 7 and 8 explain the basic principle of short-term spectral attenuation or spectral weighting. At first, the power density spectrum of background noise is estimated. The illustrated method estimates the speech quantity contained in a time/frequency tile using so-called low-level features which are a measure of "speech-likeness" of a signal in a certain frequency section. Low-level features are features of low-levels with regard to interpreting their significance and calculating complexity.

The audio signal is broken down in a number of frequency bands using a filterbank or a short-term Fourier transform, as is illustrated in FIG. 7 at 70. Then, as is exemplarily illustrated at 71*a* and 71*b*, time-varying amplification factors are calculated for all sub-bands from low-level features of this kind, in order to attenuate sub-band signals in proportion to the speech quantity they contain. Suitable low-level features are the spectral flatness measure (SFM) and 4-Hz modulation energy (4 HzME). SFM measures the degree of tonality of an audio signal and results for a band from the quotient of the geometrical mean value of all the spectral values in one band and the arithmetic mean value of the spectral components in this band. The 4 HzME is motivated by the fact that speech has a characteristic energy modulation peak at roughly 4 Hz, which corresponds to the mean rate of syllables of a speaker.

FIG. 8 shows a detailed illustration of the amplification calculation block 71*a* and 71*b* of FIG. 7. A plurality of different low-level features, i.e. LLF1, . . . , LLFn, is calculated on the basis of a sub-band $x_i$. These features are then combined in a combiner 80 to obtain an amplification factor $g_i$ for a sub-band.

It is to be pointed out that, depending on the implementation, low-level features need not be used, but any features, such as, for example, energy features etc., which are then combined in a combiner in accordance with the implementation of FIG. 8 to obtain a quantitative amplification factor $g_i$ such that each band (at any point in time) is attenuated variably to achieve speech suppression.

Depending on the circumstances, the inventive method may be implemented in either hardware or software. The implementation may be on a digital storage medium, in particular on a disc or CD having control signals which may be read out electronically, which can cooperate with a programmable computer system so as to execute the method. Generally, the invention thus also is in a computer program product comprising a program code, stored on a machine-readable carrier, for performing the inventive method when the computer program product runs on a computer. Expressed differently, the invention may thus be realized as a computer program having a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for generating a multi-channel signal comprising a number of output channel signals greater than a number of input channel signals of an input signal, the number of the input channel signals equaling one or greater, comprising:

an upmixer arranged to upmix the input signal including a speech portion in order to provide at least a direct channel signal and at least an ambience channel signal including the speech portion;

a speech detector arranged to detect the speech portion in a section of the input signal, the direct channel signal provided by the upmixer or the ambience channel signal provided by the upmixer;

a signal modifier arranged to modify a section of the ambience channel signal which corresponds to that section having been detected by the speech detector in order to acquire a modified ambience channel signal in which the speech portion is attenuated or eliminated, the section in the direct channel signal being attenuated to a lesser extent or being not attenuated; and a loudspeaker signal output device arranged to output loudspeaker signals in a reproduction scheme using the direct channel signal and the modified ambience channel signal, the loudspeaker signals being the output channel signals.

2. The device in accordance with claim 1, wherein the loudspeaker signal output device is implemented to operate in accordance with a direct ambience scheme in which each direct channel signal is mapped to a loudspeaker of its own and every modified ambience channel signal is mapped to a loudspeaker of its own, the loudspeaker signal output device being implemented to map only the modified ambience channel signal, but not the direct channel signal, to the loudspeaker signals for loudspeakers behind a listener in the reproduction scheme.

3. The device in accordance with claim 1, wherein the loudspeaker signal output device is implemented to operate in accordance with an in-band scheme in which each direct channel signal is, depending on its position, mapped to one or several loudspeakers, and wherein the loudspeaker signal output device is implemented to add the modified ambience channel signal and the direct channel signal or a portion of the modified ambience channel signal or the direct channel signal determined for a loudspeaker in order to acquire a loudspeaker output signal for the loudspeaker.

4. The device in accordance with claim 1, wherein the loudspeaker signal output device is implemented to provide the loudspeaker signals for at least three channels which are placed in front of a listener in the reproduction scheme and to generate at least two channels which are placed behind the listener in the reproduction scheme.

5. The device in accordance with claim 1, wherein the speech detector is implemented to operate temporally in a block-by-block manner and to analyze each temporal block band-by-band in a frequency-selective manner in order to detect a frequency band for a temporal block, and wherein the signal modifier is implemented to modify a frequency band in such a temporal block of the ambience channel signal which corresponds to that frequency band having been detected by the speech detector.

6. The device in accordance with claim 1, wherein the signal modifier is implemented to attenuate the ambience channel signal or parts of the ambience channel signal in a time interval which has been detected by the speech detector, and wherein the upmixer is implemented to generate the direct channel signal such that the same time interval is attenuated to the lesser extent or is not attenuated, so that the direct channel signal comprises a speech component which, when the direct channel signal is reproduced, is perceived stronger than a speech component of the modified ambience channel signal, when the modified ambience channel signal is reproduced.

7. The device in accordance with claim 1, wherein the signal modifier is implemented to subject the ambience channel signal to high-pass filtering using a high-pass filter when the speech detector has detected a time interval in which there is a speech portion, a cutoff frequency of the high-pass filter being between 400 Hz and 3,500 Hz.

8. The device in accordance with claim 1, wherein the speech detector is implemented to detect a temporal occurrence of a speech signal component, and wherein the signal modifier is implemented to determine a fundamental frequency of the speech signal component, and to attenuate tones in the ambience channel signal or the input signal selectively at the fundamental frequency of the speech signal component and at harmonics of the speech signal component in order to acquire the modified ambience channel signal or a modified input signal.

9. The device in accordance with claim 1, wherein the speech detector is implemented to determine a measure of speech contents per frequency band, and wherein the signal modifier is implemented to attenuate, by an attenuation factor, the ambience channel signal in a corresponding band in accordance with the measure of the speech contents per frequency band, a higher measure resulting in a higher attenuation factor and a lower measure resulting in a lower attenuation factor.

10. The device in accordance with claim 9, wherein the signal modifier comprises:

a time-frequency domain converter arranged to convert the ambience signal to a spectral representation;

an attenuator arranged to frequency-selectively variably attenuate the spectral representation; and a frequency-time domain converter arranged to convert the frequency-selectively variably attenuated spectral representation in a time domain in order to acquire the modified ambience channel signal.

11. The device in accordance with claim 9, wherein the speech detector comprises:

a time-frequency domain converter arranged to provide a spectral representation of an analysis signal;

a first calculator arranged to calculate one or several features per band of the analysis signal; and a second calculator arranged to calculate a measure of speech contents based on a combination of the one or the several features per band.

12. The device in accordance with claim 11, wherein the signal modifier is implemented to calculate, as the one or the several features, a spectral flatness measure (SFM) or a 4-Hz modulation energy (4 HzME).

13. The device in accordance with claim 1, wherein the speech detector is implemented to analyze the ambience channel signal, and wherein the signal modifier is implemented to modify the ambience channel signal.

14. The device in accordance with claim 1, wherein the speech detector is implemented to analyze the input signal, and wherein the signal modifier is implemented to modify the ambience channel signal based on a control information from the speech detector.

15. The device in accordance with claim 1, further comprising a speech analyzer arranged to subject the input signal to a speech analysis to provide speech analysis information;

wherein the speech detector is arranged to analyze the input signal, and wherein the signal modifier is arranged to modify the ambience channel signal based on a control information from the speech detector and based on the speech analysis information from the speech analyzer.

16. The device in accordance with claim 1, wherein the upmixer is implemented as a matrix decoder.

17. The device in accordance with claim 1, wherein the upmixer is implemented as a blind upmixer which generates the direct channel signal and the ambience channel signal only on the basis of the input signal, but without any additionally transmitted upmix information.

18. The device in accordance with claim 1, wherein the upmixer is arranged to statistically analyze the input signal in order to generate the direct channel signal, and the ambience channel signal.

19. The device in accordance with claim 1, wherein the input signal is a mono-signal including a single channel signal, and wherein the output channel signals are multi-channel signals including two or more channel signals.

20. The device in accordance with claim 1, wherein the upmixer is implemented to acquire a stereo signal including two stereo channel signals as the input signal, and wherein the upmixer is additionally implemented to determine the ambience channel signal on the basis of a cross-correlation calculation of the two stereo channel signals.

21. A method for generating a multi-channel signal comprising a number of output channel signals greater than a number of input channel signals of an input signal, the number of the input channel signals equaling one or greater, comprising:

upmixing the input signal including a speech portion to provide at least a direct channel signal and at least an ambience channel signal including the speech portion;

detecting the speech portion in a section of the input signal, the direct channel signal provided by the upmixing or the ambience channel signal provided by the upmixing;

modifying a section of the ambience channel signal which corresponds to that section having been detected in the step of detecting in order to acquire a modified ambience channel signal in which the speech portion is attenuated or eliminated, the section in the direct channel signal being attenuated to a lesser extent or being not attenuated; and outputting loudspeaker signals in a reproduction scheme using the direct channel signal and the modified ambience channel signal, the loudspeaker signals being the output channel signals.

22. A non-transitory computer readable medium having stored thereon a computer program including computer code for carrying out, when the computer program is executed on a computer, a method for generating a multi-channel signal comprising a number of output channel signals greater than a number of input channel signals of an input signal, the number of input channel signals equaling one or greater, comprising the steps of:

upmixing the input signal including a speech portion to provide at least a direct channel signal and at least an ambience channel signal including the speech portion;

detecting the speech portion in a section of the input signal, the direct channel signal provided by the upmixing or the ambience channel signal provided by the upmixing;

modifying a section of the ambience channel signal which corresponds to that section having been detected in the step of detecting in order to acquire a modified ambience channel signal in which the speech portion is attenuated or eliminated, the section in the direct channel signal being attenuated to a lesser extent or being not attenuated; and outputting loudspeaker signals in a reproduction scheme using the direct channel signal and the modified ambience channel signal, the loudspeaker signals being the output channel signals.

* * * * *

UNITED STATES PATENT AND TRADEMARK OFFICE

CERTIFICATE OF CORRECTION

PATENT NO. : 8,731,209 B2
APPLICATION NO. : 12/681809
DATED : May 20, 2014
INVENTOR(S) : Uhle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1047 days.

Signed and Sealed this
Twenty-ninth Day of September, 2015

Michelle K. Lee

Michelle K. Lee
*Director of the United States Patent and Trademark Office*